Feb. 16, 1971 L. RAYMOND 3,563,035

STEAM POWER PLANT FREEZE PROTECTION SYSTEM

Filed Oct. 3, 1969

INVENTOR.
LEONARD RAYMOND

United States Patent Office 3,563,035
Patented Feb. 16, 1971

3,563,035
STEAM POWER PLANT FREEZE PROTECTION SYSTEM
Leonard Raymond, New York, N.Y., assignor to Mobil Oil Corporation, a corporation of New York
Filed Oct. 3, 1969, Ser. No. 863,640
Int. Cl. F01k 7/44
U.S. Cl. 60—88
9 Claims

ABSTRACT OF THE DISCLOSURE

A steam power plant for use in propelling vehicles having a reservoir into which the water or condensate is drained when the engine is shut down. The condensate in the reservoir abstracts heat from a thermal energy storage material which is heated by a hot fluid stream from the steam power plant system during its operation. The heat stored in said material protects the water or condensate in the reservoir from freezing during non-use periods of normal duration at low ambient temperatures.

BACKGROUND OF THE INVENTION

The present invention relates to steam power plants and more particularly to preventing the freezing of water or other condensate during low ambient temperature periods of inactivity of steam power plants used for propelling vehicles such as automobiles, trucks and buses.

Recently, there has been a revival of interest in steam power plants for propelling automobiles and similar land vehicles. At the present time internal combustion engines dominate this field. However, there are disadvantages associated with internal combustion engines including the ever increasing problem of atmospheric pollution which has led to the passage of statutes restricting the permissible amount of pollution which may be emitted from land vehicles. The use of a steam power plant to propel land vehicles offers promise of substantial improvements in comparison to using internal combustion engines and particularly with respect to pollution levels, lower noise, and high torque at low speeds. Recent advances in steam power plant design and presently continuing accelerated research in this area indicate that large scale utilization of steam power plants for propelling land vehicles may become commercially feasible.

SUMMARY OF THE INVENTION

The present invention is concerned with providing an economical, reliable means for preventing the freezing of water or other working fluid during normal duration periods of non-use under winter conditions, i.e., periods of non-use of from one to several days.

In accordance with the invention, water or other condensate is drained from the condenser into an insulated reservoir. During periods of non-use the fluid in the reservoir is prevented from freezing by absorbing heat from a thermal heat storage material which has been heated up during the previous period of use of the power plant. The reservoir may be a double walled tank with the heat storage material disposed in the annulus between the tank walls and in turn surrounded by insulation, or the reservoir may comprise a tubular coil embedded in the body of the heat storage material within an insulated vessel. As another alternative, a mass of the thermal storage material with a heating coil therein may be contained within a body of condensate in the reservoir.

It is significant feature of the invention that the heat storage material is heated automatically during operation of the power plant by a hot fluid stream generated by operation of the power plant. In accordance with one embodiment of the invention, the heat storage material is heated by passing a small amount of steam generated in the boiler or steam generator of the power plant through a coil embedded in the heat storage material. Alternatively, exhaust combustion gases from the power plant may be utilized in lieu of steam for heating the storage material. In acordance with another presently less preferred embodiment of the invention, water being heated in the boiler may be passed through a coil embedded in the heat storage material and returned for reheating and vaporization.

The novel freeze prevention means of the invention may be utilized with essentially conventional steam power plant systems comprising a boiler or a combustor-steam generator combination, an expander which may be either a piston engine or turbine, a transmission attached to the expander, a condenser, and a pump to return condensate for reuse.

As compared to employing e.g. electrical freeze prevention heating means, the present invention eliminates the need for a relatively complex thermostatic control system and high current drain from the battery. Another alternative which may suggest itself is the use of a pilot light which has disadvantages such as safety problems connected with an unattended flame, complexity of a thermostatic control system, and an ignition system.

The above and other objects, features and advantages of the invention will become more apparent as this description proceeds.

Figure 1:
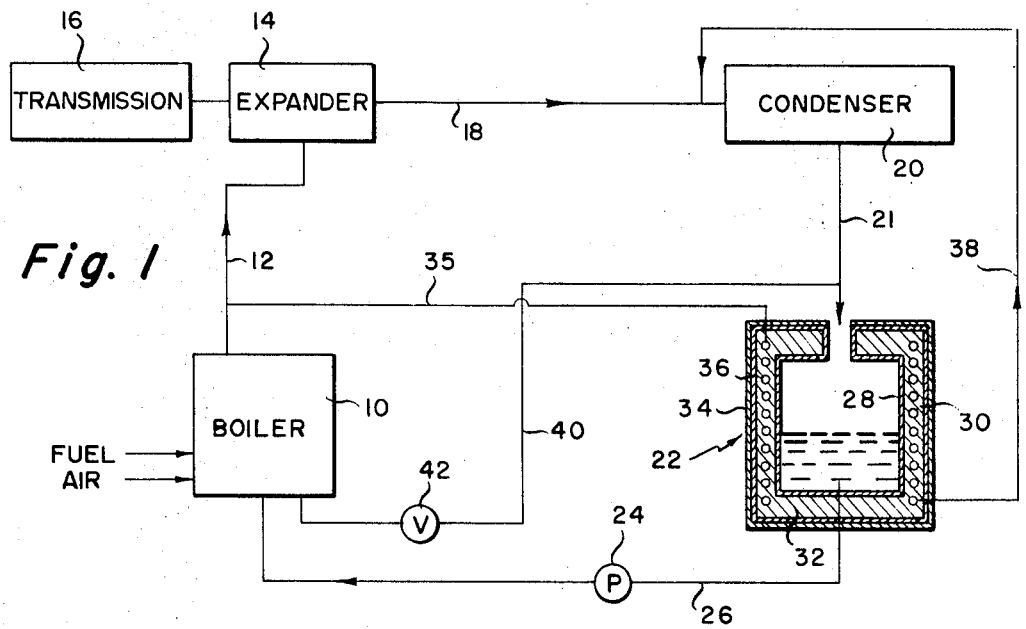
FIG. 1 is basically a flow sheet diagram of the principal parts of one embodiment of the invention with the reservoir being shown in section.

Referring now to the drawing, and more particularly to FIG. 1, reference numeral 10 designates a steam power plant of any suitable construction for example, a combustor in which air and fuel is burned in combination with a steam generator zone in which the steam is generated. The generated steam passes through steam line 12 to an expander 14 which may be either a piston engine or a turbine. If a piston engine is utilized it may be either a two or four cycle engine, either single or double expansion, and either single or double acting. A turbine if employed may be any of several known types such as single stage radial outflow turbine in which the vapor enters the turbine essentially axially at the hub and expands radially outwardly through vanes to an exhaust line. The expander is mechanically connected to the vehicle transmission 16 which in turn may be connected to the drive shaft of the vehicle so that the vehicle is propelled by the conversion of energy occasioned by the expansion of the steam within the expander.

Exhausted steam from the expander is passed through exhaust line 18 to a condenser 20, and the condensate drains through line 21 into a reservoir 22 and is returned from the reservoir by a pump 24 through a conduit 26 for reuse in the boiler.

The reservoir 22 comprises a pair of inner and outer metallic tanks 28 and 30, a mass of thermal energy storage material 32 disposed between the inner and outer tanks, and an outer casing 34 of suitable insulating material e.g., asbestos, glass fiber etc. surrounding the outer metallic tank 30. The thermal energy storage material 32 is characterized by high heat of fusion or high sensible heat content in the solid state and preferably low cost such as lithium hydroxide, aluminum oxide, magnesium oxide, silicon dioxide, titanium monoxide, zirconium dioxide etc. It should be appreciated that the aforementioned materials are merely illustrative and do not impose a limitation upon the invention.

A small portion of the steam in steam line 12 flows through line 35 to the condensate reservoir 22. The line 35 is connected to a heating coil 36 which is embedded within the heat storage material 32 so that during operation of the power plant steam flows through coil 36 and heats the storage material 32. Steam and/or condensate leaving coil 36 passes through line 38 to combine with the steam from exhaust line 18 for passage to the condenser 20 and eventual recycle to the boiler 10.

In use, assuming that the power plant after a period of operation is shut down, water or other condensate is drained from the boiler through drain line 40 and valve 42 into line 21 and then into the inner tank 28 of the reservoir. Valve 42 may be designed employing conventional means to open automatically when the power plant is shut down to close when the power plant is restarted. The condensate which collects in the inner tank 28 abstracts heat from the thermal storage material 32 and hence the condensate can be prevented from freezing during periods of inactivity, for example, when the vehicle stands overnight while exposed to below freezing temperatures.

It will of course be understood that the amount of thermal energy storage material contained in the reservoir will be sufficient to retain the necessary heat to prevent freezing of the liquid. Taking a steam power plant for an automobile employing water or steam as the working fluid by way of example, the amount of water necessary will be about two gallons or about seventeen pounds. In a volume limited system of the subject type in which space is important, in determining a suitable thermal energy storage material, the product of the heat content of the storage material per pound times its specific gravity is of more significance than the heat content of the material alone.

The specific gravity, cost, and heat content (or heat of fusion in the case of lithium hydroxide) of several representative thermal storage materials is given below in Table I. In this table in the fourth column, the 1000° F. corresponds to a temperature which the storage material might be heated using high temperature steam in the heating coil, and in the fifth column the 1500° F. temperature corresponds to the approximate maximum temperature which might be obtained without requiring expensive materials to construct the power plant if the heating fluid was combustion gases from the power plant.

TABLE I

| Material | Specific gravity | Cost (cents/lb.) | Heat content, B.t.u./lb. (approx.) | |
|---|---|---|---|---|
| | | | 1,000–40° F. | 1,500–40° F. |
| $Al_2O_3$ | 3.98 | 5 | 270 | 400 |
| MgO | 3.58 | 3 | 280 | 420 |
| $SiO_2$ | 2.32 | ¾ | 260 | 390 |
| LiOH | 1.41 | 75 | (1) | (2) |

1 Melting point 884° F.
2 Heat of fusion 378 B.t.u./lb.

Taking alumina by way of example, in view of its specific gravity of approximately four times that of water, the heat content of twenty pounds of alumina, which is equivalent in volume to only 0.6 gallon or approximately one fourth the volume of the water present, assuming that the alumina was heated to 1000° F. is approximately 5400 B.t.u. This is substantially in excess of the heat content of the two gallons of water which, assuming that the water reached a maximum temperature of 250° F., would have a heat content available to prevent reduction to its freezing temperature of approximately only 3700 B.t.u. (calculated as 250° F. minus 32° F. times 1 B.t.u./pound times seventeen pounds). From the foregoing calculations, it is apparent that the modest increase in volume of the reservoir necessitated by adding the alumina substantially increases the heat which may be stored in the reservoir to prevent freezing.

When the vehicle is restarted, the water in tank 28 is passed through conduit 26 via pump 24 to the boiler 10 for conversion to steam, and at this time the valve 42 is closed automatically by conventional means.

Figure 2:
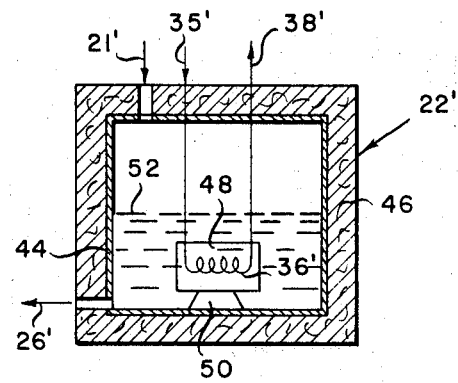
FIG. 2 is a vertical sectional view of a modified reservoir which may be utilized in the overall system of FIG 1.

FIG. 2 illustrates another embodiment of a reservoir generally designated by reference numeral 22' which may be used in lieu of the reservoir 22 of FIG. 1. In this embodiment, condensate from the condenser enters the reservoir through line 21' into the interior of a metallic tank 44 which is surrounded by insulation 46. A mass of thermal energy storage material 48 is positioned within tank 44 upon a thermally insulated support 50 beneath the water level 52 of the condensate. The thermal energy storage material 48 is heated by steam passed from steam line 12 through line 35' into heating coil 36' which is embedded within the thermal energy storage material. Steam and/or condensate leaves coil 36' through line 38' to be combined with expanded steam in exhaust line 18 upstream of the condenser as in the FIG. 1 embodiment. Condensate is passed from the reservoir through line 26' for return to the boiler.

Since the heat capacity of the thermal energy storage material is much higher than that of water, as indicated previously, a volume of the storage material considerably less than the volume of condensate which will collect in the reservoir upon shut down of the power plant is sufficient to prevent freezing of the condensate. This embodiment has the advantage that the relatively high temperature storage material gives up its heat to the surrounding condensate and it is the condensate which is in contact with the outer walls of the reservoir so there is no direct heat exchange between the storage material and the cold outer walls of the reservoir.

Figure 3:
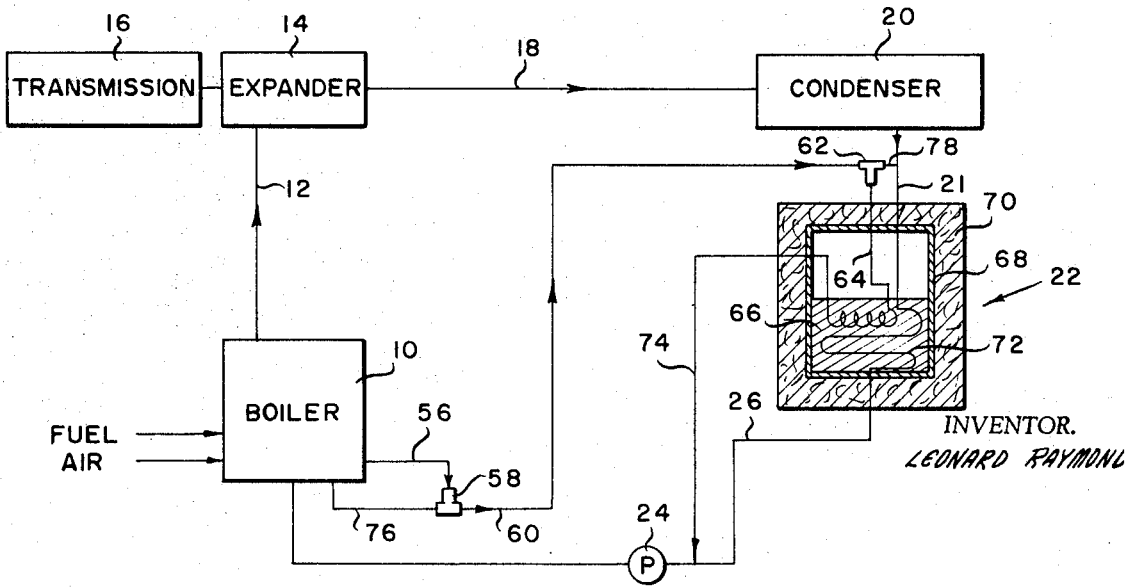
FIG. 3 is a view similar to FIG. 1 of another embodiment of the invention.

FIG. 3 illustrates another embodiment of the invention wherein parts of the system similar to that of FIG. 1 are indicated by the previously employed numerals. In this embodiment, a portion of the hot water which is formed in the power plant preparatory to the generation of steam is passed during normal operation through line 56, valve 58, line 60 and valve 62 into a heating coil 64 which is embedded in a body of thermal energy storage material 66. The heat storage material is enclosed in a metallic tank 68 which is surrounded by insulation 70. The hot water in coil 64 heats the heat storage material 66 during normal operation. At this time, condensate from the condenser flows through line 21 into a coil 72 which is also embedded in the heat storage material 66. From coil 72 condensate normally flows through line 26 and pump 24 to the boiler 10. The hot water in coil 64 after giving up a portion of its heat to the storage material 66, flows from the coil through line 74 to line 26 for return to the boiler.

When the power plant of this embodiment is shut down, the positions of valves 58 and 62 are automatically changed so that liquid in the boiler may flow through a drain line 76, valve 58, line 60, valve 62, and line 78 into the line 21 which leads to the coil 72 embedded within the heat storage material. Within coil 72, the liquid absorbs heat from the heat storage material as the vehicle stands, and freezing of the liquid is prevented in a manner similar to that described in the previous embodiments. When the engine is restarted, the positions of valves 58 and 62 are automatically changed to prevent flow through lines 76 and 78 while enabling flow of heated water from the boiler through line 56 and eventually into the heating coil 64, and condensate is pumped out of the coil 72 by pump 24 to the boiler for use in the generation of steam.

Although preferred embodiments of the invention have been shown and described with particularity, it will be appreciated that various changes and modifications may readily suggest themselves to those of ordinary skill in the art upon being apprised of the present disclosure without departing from the spirit and scope of the invention. For example, combustion gases which are burned to supply the heat for forming steam may be passed to the reservoir to heat the heat storage material contained therein.

It will also be appreciated that for the sake of simplifying the disclosure various essentially conventional minor elements of a steam power plant system have not been shown in the drawing, for example, recuperators or other heat exchangers which might be utilized to extract heat from the exhaust gases and/or to preheat air and fuel to the boiler. Such elements are well known to those skilled in the art and do not form part of this invention.

What is claimed is:

1. A steam power plant propulsion system for a vehicle comprising a boiler, an expander, conduit means for passing steam from said boiler to said expander, a vehicle transmission operatively connected to said expander, a condenser for condensing exhaust steam from said expander, a reservior containing condensate from said condenser, said reservoir having a mass of thermal energy storage material in heat exchange relationship with said condensate, means for draining liquid from said boiler to said reservoir upon shut down of the power plant, and conduit means to pass a high temperature fluid stream generated during operation of said power plant to said reservoir to heat said storage material during normal operation of said power plant whereby said storage material provides heat to prevent freezing of the condensate at low ambient temperatures upon shut down of said power plant.

2. Apparatus according to claim 1, wherein said reservoir includes an inner tank into which the condensate is drained, and wherein said storage material is disposed surrounding said inner tank.

3. Apparatus according to claim 2, further comprising thermal insulation surrounding said reservoir.

4. Apparatus according to claim 2, further comprising a heating coil embedded in said storage material and connected to said conduit means.

5. Apparatus according to claim 1, wherein said conduit means comprise means for passing steam generated in said power plant to said reservoir to heat said storage material.

6. Apparatus according to claim 1, wherein said reservoir comprises an inner tank containing the condensate, and wherein said mass of thermal energy storage material is positioned within the condensate in said inner tank.

7. Apparatus according to claim 6, further comprising a heating coil embedded in said storage material and connected to said conduit means.

8. Apparatus according to claim 1, wherein said reservoir comprises a conduit for containing the condensate embedded in a mass of said storage material.

9. Apparatus according to claim 1, wherein said conduit means include means for passing heated water from said boiler into heat exchange relationship with said storage material during normal operation and for subsequently returning the water to said boiler.

References Cited
UNITED STATES PATENTS

| | | | |
|---|---|---|---|
| 1,451,242 | 4/1923 | Viberg | 137—340X |
| 1,770,256 | 7/1930 | Smekal | 122—35 |
| 1,863,437 | 6/1932 | Collier | 165—134X |
| 3,179,164 | 4/1965 | Heller | 165—134X |

MARTIN P. SCHWADRON, Primary Examiner

A. M. OSTRAGER, Assistant Examiner

U.S. Cl. X.R.

60—92, 107; 122—35; 165—134; 137—340